United States Patent
Kovach et al.

(10) Patent No.: US 8,900,496 B2
(45) Date of Patent: Dec. 2, 2014

(54) EDGE SEALS FOR COMPOSITE STRUCTURE FUEL TANKS

(75) Inventors: Daniel J. Kovach, Kent, WA (US); Kari L. Stromsland, Seattle, WA (US); Diane L. Heidlebaugh, Kenmore, WA (US); John A. Ward, Sumner, WA (US); Arlene M. Brown, Normandy Park, WA (US); Donald K. Dabelstein, Renton, WA (US)

(73) Assignee: The Boeing Company, Chicago, IL (US)

( * ) Notice: Subject to any disclaimer, the term of this patent is extended or adjusted under 35 U.S.C. 154(b) by 1933 days.

(21) Appl. No.: 11/581,120

(22) Filed: Oct. 13, 2006

(65) Prior Publication Data
US 2008/0128430 A1   Jun. 5, 2008

(51) Int. Cl.
| | |
|---|---|
| F17C 1/02 | (2006.01) |
| B64D 37/06 | (2006.01) |
| B64D 37/32 | (2006.01) |
| B32B 27/00 | (2006.01) |
| B29C 63/00 | (2006.01) |
| B29C 63/04 | (2006.01) |

(52) U.S. Cl.
CPC ............ B64D 37/32 (2013.01); *B29C 63/0034* (2013.01); *B29C 63/04* (2013.01); B64D 37/06 (2013.01); B32B 27/00 (2013.01)
USPC .......................................... 264/138; 156/216

(58) Field of Classification Search
USPC .......................................... 156/216; 264/138
See application file for complete search history.

(56) References Cited

U.S. PATENT DOCUMENTS

| | | | |
|---|---|---|---|
| 4,336,291 A * | 6/1982 | Broadhurst et al. | 428/101 |
| 4,382,049 A | 5/1983 | Hofmeister et al. | |
| 4,448,838 A | 5/1984 | McClenahan et al. | |
| 4,502,092 A | 2/1985 | Bannink | |
| 4,556,591 A | 12/1985 | Bannink | |
| 4,824,713 A | 4/1989 | Brick | |
| 4,905,931 A | 3/1990 | Covey | |
| 4,916,401 A | 4/1990 | Bogard et al. | |
| 4,920,449 A | 4/1990 | Covey | |
| 5,461,534 A | 10/1995 | Gondot et al. | |
| 5,752,909 A * | 5/1998 | Sagvik et al. | 493/405 |
| 7,090,167 B2 | 8/2006 | Friddell | |
| 7,438,974 B2 | 10/2008 | Obuhowich | |
| 2005/0144874 A1 * | 7/2005 | West et al. | 52/459 |

OTHER PUBLICATIONS

Pridham et al., "Integral Lightning Strike Protection of CFC Fuel Tanks on Aircraft," SAE Technical Paper Series, International Conference on Lightning and Static Electricity, The Engineering Society for Advancing Mobility Land Sea Air and Space International, Sep. 2001, 7 pages.

(Continued)

*Primary Examiner* — Galen Hauth
(74) *Attorney, Agent, or Firm* — Hanley, Flight & Zimmerman, LLC

(57) ABSTRACT

The cut laminate edges of aircraft fuel tanks formed of carbon fiber reinforced polymers are sealed to prevent the exposure of carbon fibers to combustible fuel. The edge seal is produced from a prepreg form using a thermosetting resin matched to the characteristics of the resin used in the laminate. The prepreg form can be applied to the cut laminate edges either before or after the laminate is cured. The edge seal acts as a dielectric layer that both electrically insulates the cut laminate edges from the fuel and mechanically contains energetic particles produced at the edges due to lightning strikes or other sources of electrical charges.

5 Claims, 2 Drawing Sheets

(56) References Cited

OTHER PUBLICATIONS

Heidlebaugh et al., "Photographic Spark Detection Film Sensitivity Study," SAE Technical Paper Series, International Conference on Lightning and Static Electricity, The Engineering Society for Advancing Mobility Land Sea Air and Space International, Sep. 2001, 10 pages.

The Lightning Task Group of EEHWG, "Protection of Aircraft Fuel Systems Against Fuel Vapor Ignition Due to Lightning," The Lightning Task Group of EEHWG, Jul. 22, 1995, 7 pages.

Dave Walen, "Electrical Bonding and Transient Suppression," Power Point Presentation, FAA Fuel System Safety, Aug. 27, 2002, 31 pages.

* cited by examiner

EDGE SEALS FOR COMPOSITE STRUCTURE FUEL TANKS

BACKGROUND OF THE INVENTION

1. Field of the Invention

The present invention broadly relates to composite structure fuel tanks, especially for aircraft, and deals more particularly with a laminate edge construction that reduces the possibility of fuel combustion due to an electric charge.

2. Description of the Related Art

Federal regulations are imposing increasingly stringent standards for fuel tanks used on commercial aircraft. These regulations are directed toward reducing the possibility that fuel or fuel vapors in or around the tank might be ignited by ignition sources such as an electrical charge or spark produced by direct lightning strikes or other electrical currents reaching the fuel due to catastrophic structural failures.

Various solutions have been proposed for mitigating the risk of fuel tank ignition, but each has limitations and none has been entirely successful. For example, bladders have been employed to isolate fuel within tanks from the effects of an ignition event caused by failure of the fuel tank structure, however this solution requires relatively complicated tank geometry and is inefficient when applied to commercial transport aircraft. Another solution involves of the use of a completely metallic internal structure for the fuel tank, but this approach is both inefficient from a strength and stiffness-to-weight standpoint, and is expensive relative to other potential solutions.

Composite structure fuel tanks are commonly used in commercial transport aircraft but these tanks also require protection against potential ignition of fuel. Composite structure fuel tanks are typically manufactured from structural members comprising carbon fiber reinforced polymer laminates. The laminate members must be trimmed to size, typically using a diamond saw or water jet cutter. Prior to trimming, the carbon fibers are sealed by the epoxy resin within the laminate, but cutting of the laminate during the edge trimming process results in the carbon fibers being exposed at the cut edges.

Some of these cut edges on the laminated structural members may be exposed to the interior of the fuel tank or to fuel lines where small amounts of fuel or fuel vapor may be present. When subjected to a high energy electrical charge such as that resulting from a lightning strike, and result in sparking between the fibers, or the release of highly energized particles which have the potential to ignite fuel. However, in order to partially mitigate this risk, polysulfide-based sealants have been applied to the cut laminate edges. The application of such sealants requires experienced personnel and is labor intensive in terms of both the sealant application and subsequent in-service inspection. Moreover, these sealants must be applied after the fabrication of the fuel tank structure is completed since the sealant layers are relatively fragile and thus subject to damage caused by handling or assembly of tank substructures. Another drawback of polysulfide-based sealants is that failures in the sealant coating are difficult, or sometimes impossible to inspect. This detection problem is due in part, to the fact that polysulfide-based sealants are opaque, and thus visually mask underlying bonding defects or defects in the composite structure. As a result, failure of polysulfide-based sealants can result in latent defects during in-service maintenance and inspections.

Another potential solution to the problem of reducing the risk of fuel tank ignition involves designing composite fuel tanks without the use of internal cut laminate edges, however this approach generally results in highly inefficient fuel tank designs from a fuel capacity to weight standpoint.

Accordingly, there is a need for a composite structure fuel tank in which cut edges of the laminate are permanently sealed, and both mechanically isolated and electrically insulated from fuel within the tank. The present invention is directed towards satisfying this need.

BRIEF SUMMARY OF THE INVENTION

In accordance with one aspect of the invention, an edge seal is provided for use in protecting a carbon fiber reinforced composite fuel tank against fuel ignition caused by an electrical charge. The edge seal covers a cut edge of the composite exposed to the fuel within the tank and includes a layer of dielectric material that insulates exposed carbon fibers in the cut edge from fuel in the tank. The dielectric layer is a thermosetting polymer resin, preferably having material characteristics that match the thermosetting polymer used in the composite. The dielectric layer includes at least one layer of reinforcement which is preferably nonconductive and translucent.

In accordance with another aspect of the invention, a seal is provided for sealing an exposed cut edge in a fiber reinforced composite laminate fuel tank for aircraft. The seal includes a thermosetting resin which covers the cut laminate edge and forms a dielectric layer that insulates exposed carbon fibers in the cut edge from fuel in the tank. The seal further comprises a layer of reinforcement covering the edge which is impregnated with the resin. The resin impregnated reinforcement is applied to the edge either before or after the composite structure has been cured.

According to a further aspect of the invention, a method is provided for protecting a carbon fiber reinforced laminate fuel tank against fuel ignition caused by an electrical charge, comprising the steps of: applying a dielectric seal over cut edges of the laminate that are exposed to the fuel. The seal applying step includes depositing a layer of thermosetting resin over the cut edge, and then curing the deposited layer. The seal applying step may further include applying a layer of reinforcement over the edge. The seal may be applied by wrapping a prepreg form around the cut edge.

In accordance with still another aspect of the invention, a method is provided for fabricating a combustion resistant fuel tank for aircraft, comprising the steps of: forming the body of the fuel tank from carbon fiber reinforced polymer laminate, and sealing cut edges of the laminate to prevent exposure of carbon fibers in the cut laminate edges to fuel in the tank. The fuel tank body is formed by laying up and curing a laminate. The edges of the laminate are sealed by applying a prepreg form over the cut laminate edges and curing the prepreg form. The prepreg form may be applied to the laminate edges either before or after the laminate is cured.

These and other features, aspects and advantages of the invention will become better understood with reference to the following drawings, description and claims.

DETAILED DESCRIPTION OF THE INVENTION

Figure 1:
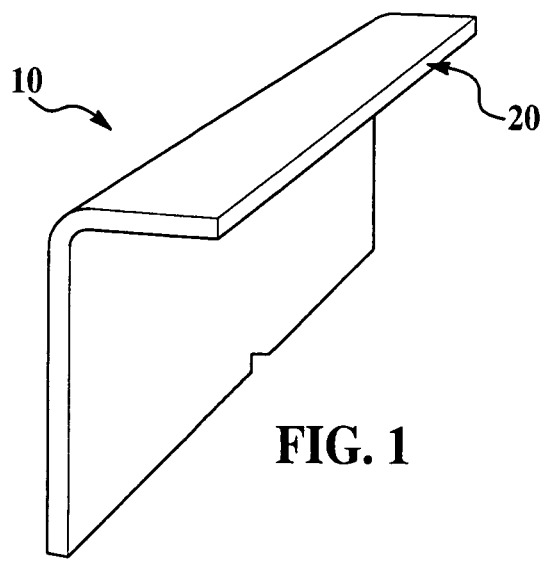
FIG. 1 is a perspective view of a carbon fiber reinforced laminated spar, trimmed to size and having a cut edge.
Figure 2:
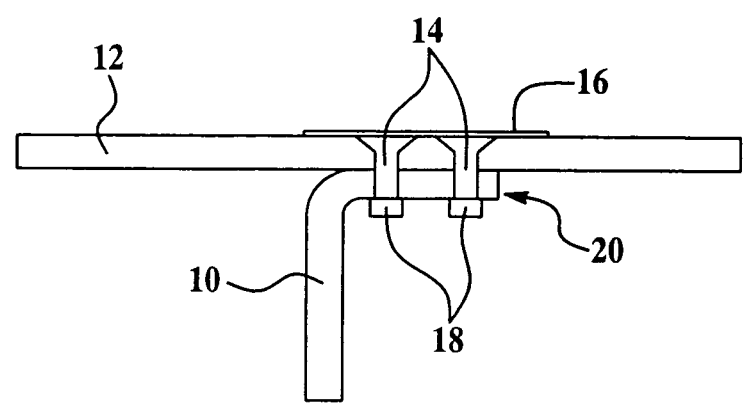
FIG. 2 is an end view of the spar shown in FIG. 1, connected to a skin.

Referring first to FIGS. 1 and 2, a variety of carbon fiber reinforced polymer composite (CFRP) structural members are commonly employed in aircraft construction, such as a structural spar member 10 which is used to support numerous types of structures. For example, CFRP structural members like the spar 10 are used to fabricate and mount fuel tanks (not shown) in an aircraft. In the illustrated embodiment, the spar 10 is secured to and supports a skin 12, using fasteners 14, which pass through a copper plate 16 forming part of an electrical current diversion system, and are held in place by fastening collars 18. It should be noted here that although an L-shaped spar has been selected to illustrate the principals of the invention, a wide variety of other forms of structural members are suitable for use with the present invention, including C-shaped spars which are more commonly used in constructing commercial aircraft.

The spar 10 is manufactured using conventional layup techniques, which include laying multiple plies of unidirectional knitted or woven reinforcing fiber in tape or mat form, over a tool (not shown), impregnating the fiber reinforcement with a thermosetting resin, such as epoxy resin, and then compacting and curing the layup. The layup can also be formed using prepreg. During the compaction process, a certain amount of the epoxy resin is forced out through the edges of the spar 10, effectively covering the reinforcing fibers at the spar edges. Following curing, the spar 10 is trimmed to the required final dimensions, using a water jet cutter or other form of cutting equipment. This trimming process leaves a "cut" edge in which the individual reinforcing fibers at the edge are no longer covered and sealed by the resin, but rather are exposed to the surrounding environment. One such cut edge is indicated by the numeral 20, which runs the entire length of the spar 10.

Figure 3:
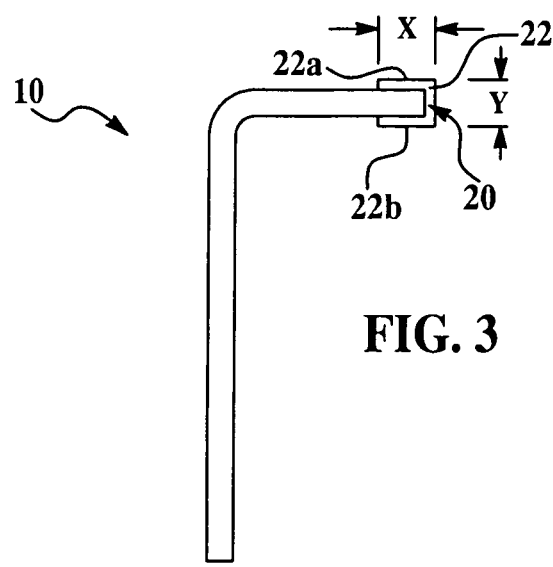
FIG. 3 is an end view of the spar shown in FIG. 1, but showing a cut edge covered by an edge seal forming an embodiment of the invention.
Figure 4:
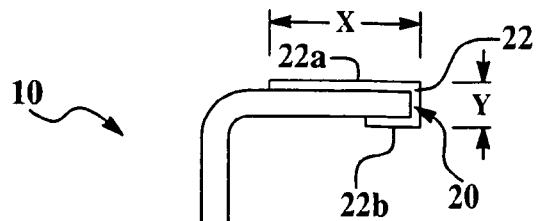
FIG. 4 is a view similar to FIG. 3, but showing an alternate embodiment of the edge seal.

Referring now also to FIGS. 3 and 4, the present invention comprises an edge seal 22 which functions to protectively cover the cut edge 20, and mitigate the risk that exposed carbon fibers may contribute to a sparking event that could ignite fuel. The edge seal 22 comprises a layer of thermosetting resin, preferably reinforced by one or more layers of reinforcing materials. The reinforcement may comprise unidirectional woven or knitted carbon fibers or fiberglass fibers, for example. In one embodiment, the edge seal 22 may comprise a single layer of carbon fiber reinforcement, impregnated with epoxy resin. Other possible embodiments and variations will be discussed below.

While the thermosetting resin used in the edge seal 22 preferably comprises epoxy, other thermosetting resins such as polyester may be used. Importantly, the material characteristics of the particular thermosetting material used in the edge seal 22 should be selected to match those of the thermosetting resin used in forming the structural member to which the seal is applied, which in the illustrated example, is a CFRP composite spar 10.

The edge seal 22 forms an insulating dielectric layer between the cut edge 20 and areas in or around the fuel tank where fuel or fuel vapors may be present. In addition, the edge seal 22 forms a mechanical barrier that prevents energetic, hot particulates from being ejected from the edge 20. As used herein, the term electric charge is intended to include electrical potentials generated from any of various sources, including lightning strikes, buildup of static charges or other charge sources created by catastrophic structural failures. Such charges can result in voltage and/or thermal sparking at the cut edge 20, and particularly between the exposed carbon fibers at the edge 20. Voltage sparking is the result of dielectric breakdown including tracking or flashover across dielectric surfaces. Thermal sparking consists of burning fragments of melted material thrown outwardly away from hot spots such as the carbon fibers.

The exact construction and choice of materials used in the edge seal 22 will depend on the application, and particularly the types, levels and duration of electrical charges that are to be protected against. For example, lower energy charge events that result in low level electrical sparking, also known as edge glow, at the edge 20 may be contained using an edge wrap 22 that is either relatively thin or contains a reinforcement layer that is either thin or light weight. Higher energy electrical spark events that eject hot particulates from the edge 20 may require the use of a thicker edge seal 22, or one that employs a reinforcement that is sufficiently strong to physically contain the hot particulates. Since the various reinforcements that may be used successfully have different weights, the spark mitigating properties provided by each potential type of reinforcement may need to be balanced against the weight penalties represented by heavier reinforcements.

The edge seal 22 may comprise a prepreg form which includes the previously mentioned sheet or tape of reinforced fibers that have been impregnated with thermosetting resin. The prepreg form is preferably in a semi-cured or B-stage when it is applied to the edge 22. As used herein, "B-stage" refers to an intermediate stage in the reaction of a thermosetting resin, in which the material swells when in contact with certain liquids and softens when heated, but may not entirely dissolve or fuse. These B-stage materials are often in the form of sheet material impregnated with a resin cured to an intermediate stage, also known as prepreg. A prepreg is a ready to mold material in sheet form which may be cloth, mat or other reinforcement impregnated with resin cured to a B-stage. The prepreg is used to lay-up the part into the finished shape, following which the lay-up is cured with heat and pressure.

The prepreg form may be applied to the edge 20 of the spar 10 either before or after spar 10 is cured. As previously mentioned, it is important that the material characteristics of the prepreg form are selected to match those of the spar 10. For example, the coefficient of thermal expansion (CTE) of the CFRP laminate forming the spar 10 and the prepreg form used for the edge seal 22 should be closely matched. By using a thermosetting resin for both the spar 10 and the edge seal 22, a particularly good bond is achieved between the edge seal 22 and the cut edge 20.

Figure 5:
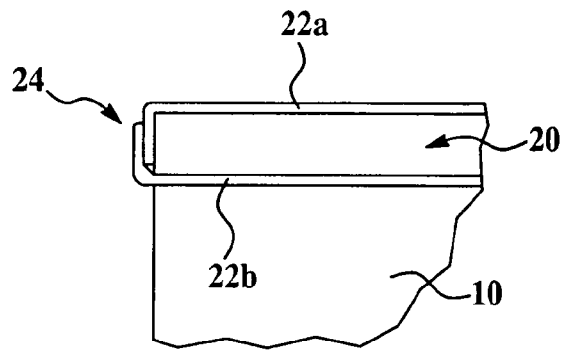
FIG. 5 is a fragmentary, cross sectional view of an end of the cut edge but showing the edge wrap covering the end of the spar.

As can be seen in FIGS. 3 and 4, the edge seal 22 is wrapped around edge 20 so as to overlap the opposite faces of the end of the spar 10. Specifically, the edge seal 22 includes overlapping portions 22a, 22b which assure that the edge seal 22 is tightly bonded to the spar 10, and that any sparks generated in the cut edge 20 are well isolated from the surrounding area. The amount of overlap will depend on the particular application, the materials and the dimensions of the parts. Generally, the width "X" of the overlap should be approximately equal to or greater than the depth "Y" of the cut edge 20. In some cases, such as that shown in FIG. 4, one of the overlapping portions 22a may be greater than the other overlapping portion 22b. As shown in FIG. 5, depending on the application, the edge seal 22 may be wrapped over the ends 24 of the spar 10, adjacent the cut edge 20, thereby further isolating the cut edge 20 from the surrounding environment.

While a single layer of epoxy impregnated carbon fiber reinforcement has been found to be particularly effective in mitigating higher energy sparking events at the cut edge 20, other material combinations may be used that are compatible with the material system employed to fabricate the structural member on which the edge seal is installed. For example, 3 plies of thermosetting resin impregnated fiberglass totaling 12.3 mils in thick was found to provide an effective edge wrap for a 0.32 inch thick CFRP cut edge. The use of 2 plies of thermosetting resin impregnated fiberglass combined with one layer of surfacing film totaling 13.2 mils thick was also found to provide effective mitigation results for a 0.32 inch thick CFRP cut edge. Either of the fiberglass or CFRP layer can be combined with an epoxy adhesive layer or a layer of surfacing film if desired. Optimum spark mitigation at the higher energy levels may be achieved using a single layer of CFRP in combination with a layer of epoxy adhesive. Finally, using the above example of a 0.32 inch thick cut CFRP edge, lower energy level sparking events can be mitigated using a single 4.1 mil thick layer of resin impregnated fiberglass, or a single 5 mil thick layer of surfacing film, or a single 5 mil thick layer of epoxy adhesive. In general, nonconductive reinforcing fibers are preferred, however, conductive fibers may also be used. Furthermore, reinforcing fibers that result in a translucent reinforcement layer are desirable; such fibers include glass, quartz and polyethylene.

Figure 6:
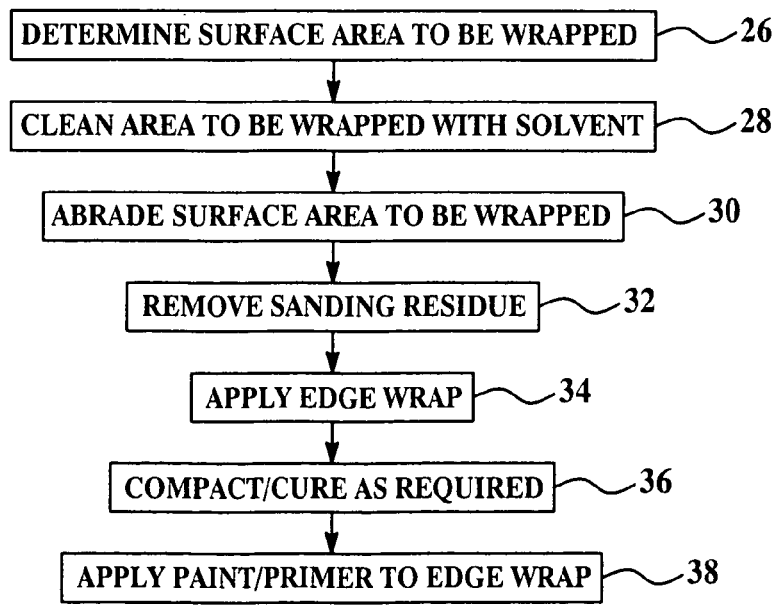
FIG. 6 is a simplified flow chart showing the basic steps in applying the edge seal of the present invention.

Reference is now made to FIG. 6 which shows the basic steps used in applying the edge seal 22 of the present invention to the cut edge 20. First, at step 26, a determination is made as to what surface areas on and around the cut edge 20 are to be covered by the edge wrap 22, based on the various considerations previously discussed. Then at step 28, the surface area to be wrapped is cleaned using an appropriate solvent. Next, at step 30, the surface area to be covered is abraded, using sandpaper for example, to assure that an effective bond is achieved with the edge seal 22. At step 32, the sanding residue is removed from the bonding surface. The edge wrap 22 is then applied to the cut edge 20, as previously described. At step 34, an adhesive may first be applied to the cut edge 20 and those areas of the opposite faces of the spar 10 where the edge seal 22 is to overlap. One suitable adhesive is a structural adhesive film available from the 3M Company and identified by the manufacturer's designation of "Scotch-Weld" AF555 which comprises an epoxy film adhesive particularly suited for use with composite materials.

Next, a perform of the materials that form the edge wrap 22 are cut and applied to both cut edge 20 and wrapped around the adjacent surfaces, depending on the exact configuration and dimensions of the edge seal 22. The edge seal 22 is then compacted at step 36 using an autoclave or vacuum bagging, and cured at elevated temperature for an appropriate period of time. Following curing, the part (spar 10), including the edge seal 22, is primed and painted at step 38. The primer may comprise a corrosion resistant, epoxy primer commonly used to coat fuel tanks.

In addition to the mechanical and electrical properties of the edge seal 14 described above, the thermosetting resin dielectric composite materials used in the edge seal 22 allow visual inspection for damage to the underlying composite structure resulting from mechanical abuse or past electrical transmit stresses, such as those from lightning strikes. This is due to the fact that the thermosetting resins and reinforcement layers used in the edge seal 22 are translucent to some degree and visually reveal damage to the surface of the spar 10 or to the edge seal-spar bond that can result from sparking or physical impacts. For example, in the event of a lightning strike that debonds a portion of the edge seal 22 from the underlying laminate forming the spar 10, an inspector can visually detect this condition. Since both the thermosetting resin and reinforcement used in the edge seal 22 are non-conducting, the edge seal 22 provides, in effect, electrical shielding between the fuel and cut edges 20, where transient high voltage potential differences may be present during a lightning strike.

The edge seal 22 functions to contain the pressures and energies at the cut edge 20 even during high electrical charge events such as direct attach lightning strikes. The use of thermosetting resins in combination with reinforcements which form the seal 22 provide a durable and robust edge treatment which can be carried out using conventional composite processing techniques. The edge seal 22 acts as a durable layer that both electrically insulates and mechanically restrains any hot particulates from emanating from the cut edge 20.

Although this invention has been described with respect to certain exemplary embodiments, it is to be understood that the specific embodiments are for purposes of illustration and not limitation, as other variations will occur to those of skill in the art.

What is claimed is:

1. A method of fabricating a combustion resistant fuel tank for aircraft, comprising:
    forming the fuel tank from carbon fiber reinforced polymer laminate members, the laminate members comprising a thermosetting resin;
    cutting at least certain of the laminate members to a desired size to form cut laminate edges; and
    sealing the cut laminate edges by depositing a dielectric material to wrap the cut laminate edges, cover a portion of an interior side of the laminate members, and cover a portion of an exterior side of the laminate members to prevent electrical discharge into the fuel tank.

2. The method of claim 1, wherein;
    forming the fuel tank comprises laying up the laminate members, and
    sealing the cut laminate edges comprises depositing at least two layers of prepreg form over the cut laminate edges, and curing the prepreg form.

3. The method of claim 2, wherein the at least two layers of prepreg form is applied to the cut laminate edges before the laminate members are fully cured.

4. The method of claim 2, wherein the at least two layers of prepreg form is applied to the cut laminate edges after the laminate members are cured.

5. The method of claim 2, wherein the prepreg form is in a B-stage of cure when applied to the cut laminate edges.

* * * * *